Sept. 17, 1935.   C. C. LEY ET AL   2,014,853
CABLE JOINT
Filed Jan. 20, 1933
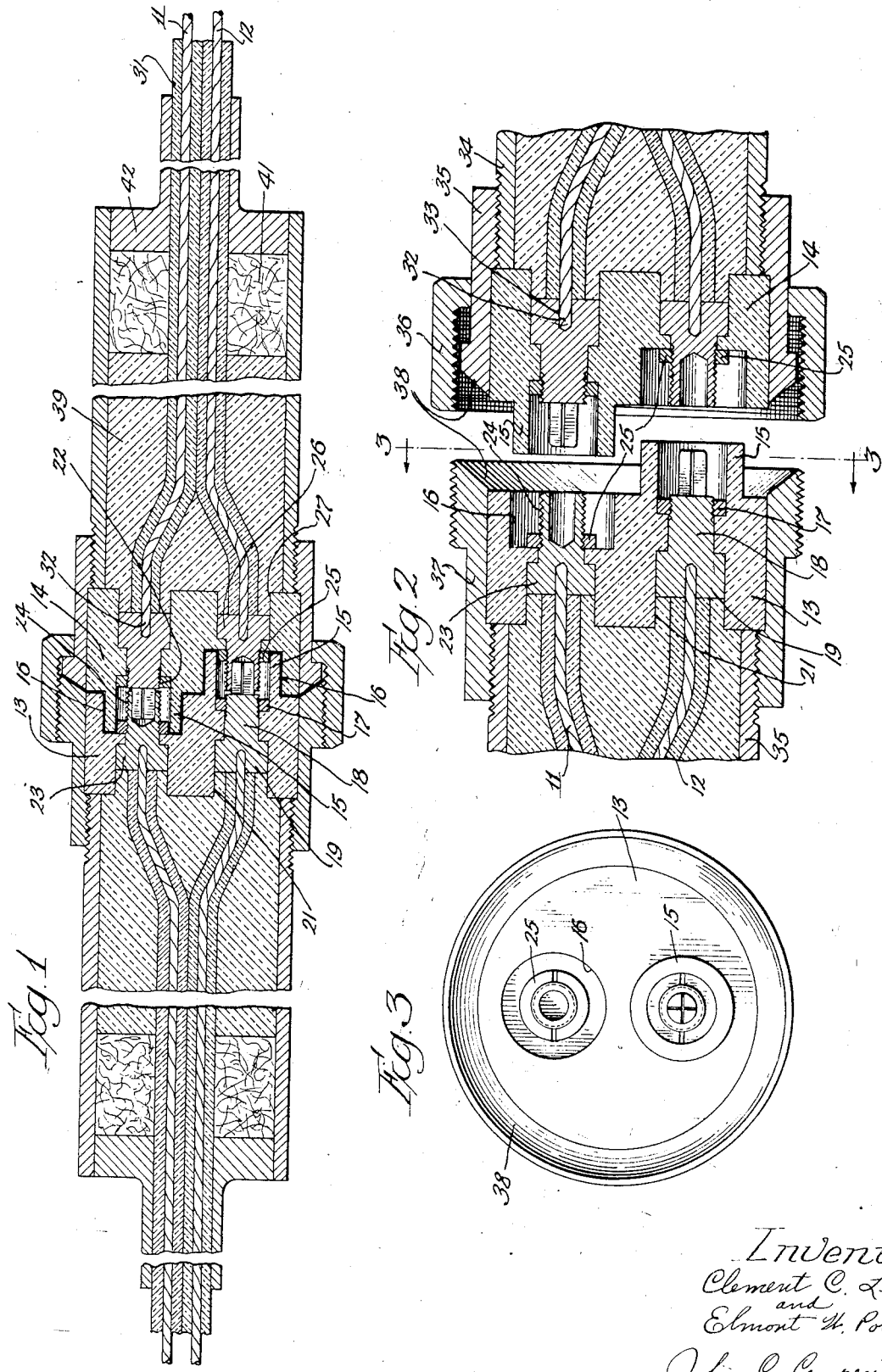
Inventors
Clement C. Ley
and
Elmont W. Porch
John C. Carpenter
Atty.

Patented Sept. 17, 1935

2,014,853

UNITED STATES PATENT OFFICE 2,014,853

CABLE JOINT

Clement C. Ley, Wilmette, and Elmont W. Porch, Kenilworth, Ill.

Application January 20, 1933, Serial No. 652,652

3 Claims. (Cl. 173—328)

This invention relates in general to detachable couplings for high voltage electric cables, and has for its object broadly the provision of a simple coupling adapted for ready disconnection and constructed to prevent leakage or arcing under the pressures resulting from extremely high voltages.

The invention has for an important object the provision of a coupling of the character described adapted for the simultaneous connection and disconnection of two or more cables without danger of leakage across from the one to the other, or others, under the pressure of high voltage.

Another important object of the invention is the provision of a coupling of the character described, which will be entirely water and moisture proof, and which at the same time may be readily connected and disconnected without the need of a specially provided packing between the connected parts.

Another important object of the invention is the provision of a cable coupling of the character described, in which disconnection and reconnection may be accomplished through the simple process of merely disconnecting the parts mechanically and reassembling them in their original mechanical relation without loss of insulating properties and without providing opportunity for subsequent introduction of water or moisture within the coupling.

Another important object of the invention is the provision of a coupling of the character described, which may be cheaply manufactured and readily installed without requiring workmanship and technique beyond that usually possessed by workmen available for installation and care of high voltage electric lines. The invention contemplates in this regard the elimination of the necessity for splicing the cables as an incident to the use of the coupling, the elimination also of the necessity for providing wiped lead joints at or adjacent the coupling.

Another important object of the invention is the provision of a coupling of the character described, which may be used both in aerial and underground wiring, and which will be of compact form, this last permitting the convenient use of the coupling in manholes of restricted capacity.

Numerous other objects and advantages of the invention will be apparent as it is better understood from the following description, which, taken in connection with the accompanying drawing, discloses a preferred embodiment thereof.

Referring to the drawing:

Figure 1 is a longitudinal sectional view, taken on the axis of a coupling embodying the present invention, parts being broken away;

Fig. 2 is a similar, somewhat enlarged view showing the parts in separated or detached relation; and Fig. 3 is an elevation looking toward the ends of one of the coupling members and generally from the plane indicated by the line 3—3 in Fig. 2.

The coupling shown on the drawing for the purpose of illustrating the present invention is adapted for the connection of two electric cables 11 and 12. It comprises a pair of intermating blocks 13 and 14 of hard rubber or other electrically insulating material. Each of these blocks, in the present instance, is provided with an outwardly projecting cylindrical flange 15 adapted to seat into a companion recess 16 in the other block. Inwardly of the flange 15 a recess 17 is provided, and a male conducting member 18 extends through the block and well up within the surrounding flange 15. Each conducting member 18 is provided with an enlarged or shouldered head 19 which fits into a recess 21 extending in from the rear of the block. A nut 22 is threaded upon the conducting member 18 within the flange 15 and clamps it tightly in place in the block.

A companion female conducting member 23 is similarly arranged through the block and to extend up into the companion recess 16 of the companion block. Each conducting member 23 is threaded at 24 for engagement with a nut 25 of outside diameter less than the diameter of the flange 15. Each female conducting member 23 is shouldered at 26 to fit into a recess 27 in its insulating block. The ends of companion conducting members 18 and 23 are adapted to intermate in firm engagement, as may be observed in Fig. 1. The cables 11 and 12 to be connected are embraced, as illustrated, by an insulating covering 31 which is skinned or stripped back from the extreme ends 32 of the cables 11 and 12 to permit these ends to extend into suitable recesses 33 provided in the rear faces of the conducting members 18 and 23. In the insulation of the coupling, it is preferable that the insulation or covering 31 extend flush up against the rear faces of the companion conducting members.

Two metal sleeves 34 and 35 are threaded at their adjacent ends and have external diameter substantially equal to the external diameter of the blocks 12 and 14. A union coupling consisting of a shouldered sleeve 35, a union nut 36, and a threaded sleeve 37 is or may be provided to draw the parts tightly into assembling relation. The adjacent faces of the shouldered sleeve 35 and the sleeve 37 are preferably ground accurately for tight beveled engagement, as indicated at 38, and the dimension of the adjacent faces of the blocks is preferably such that when interengaged they fit snugly into intermating relation with each other.

The cable ends 11 and 12 are arranged within the recesses in the rear of the conducting members with the insulating covering in engagement with, or substantially in engagement with, the rear faces of the conducting members. Thereafter, an insulating compound, indicated by reference character 39, is poured into the sleeves 34 and 35 and allowed to harden. A fibre or jute packing 41 is arranged at the ends of the insulating bodies thus provided in the sleeves and the whole is or may be closed with a lead filling 42. Thus constructed and arranged, it would be apparent that the blocks 13 and 14 have intermating parts arranged in telescoped relation embracing the intermating parts of the conducting connections between pairs of cable ends, and that the intermating portions of the blocks and of the conducting members may be arranged in zones spaced axially of the coupling, so that when the coupling is disconnected, it may be again joined together without danger of confusion in the cable ends to be joined. Where three pairs of cable ends are to be connected with a single coupling, one set of intermating parts may be arranged in one zone and the other two in a zone axially spaced from the first.

Opportunity for arcing across the backs of the blocks is minimized by arranging the connections between the cable ends 32 and the conducting members well down in the recesses provided in the rear faces of the insulating blocks 13 and 14 and the telescoping of the intermating parts of the blocks at the adjacent faces prevents direct line for arcing across the terminals.

The connection of the cables to the coupling members and the connection of the coupling parts together are simple operations requiring no special technical skill of the workman. The union connection when tightened prevents opportunity for entrance of moisture, if the parts be constructed with reasonable exactness. Of course, white lead may be readily provided to pack the joint and still leave an easily separable coupling. Cables of this character are generally buried in the ground, and the jointed connections are located in a manhole. The most common practice of jointing cables in this field is by soldering the wires together and applying an insulating compound about them, and then by slipping a lead sleeve over the joints. The ends of the sleeve are then secured to the cable. This makes a permanent jointed connection, and in the event that it becomes necessary to check up on the wire connections in the joint, it can be readily be seen that in order to get at the wires the joint must be destroyed. It is a well-known fact that manholes frequently fill with water. Therefore, the jointed connections are likely to be under water part of the time, and often the water will seep through the jointed connection and cause a short circuit. With our improved joint it is practically impossible for water and moisture to seep into the coupling in view of the fact that the union when tightened tends to make a water and moisture-proof joint and further, the joint, being semi-permanent, can easily and quickly be separated.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A detachable semi-permanent coupling for high voltage cables comprising a pair of multi-conductor cables, interconnectable metallic sleeves, one attached to each cable, an insulating block secured in the end of each of said sleeves opposite that of the respective cable, said blocks having recesses, certain of which recesses extend below the outer surfaces of the blocks, the other recesses being each surrounded by annular flanges extending beyond the faces of the blocks, said flanges being adapted to enter the recesses extending below the faces of the blocks, conductor terminal members connected with their respective conductors and secured in and concealed by the recesses, and means for tightly drawing up the sleeves to form a water-tight and moisture-proof connection.

2. A detachable semi-permanent coupling for high voltage cables comprising a pair of multi-conductor cables, interconnectable metallic sleeves, one attached to each cable, an insulating block secured in the end of each of said sleeves opposite the end of the respective cable and having recesses therein, certain of the said recesses extending below the outer surfaces of the block and the other recesses being each surrounded by an annular flange extending beyond the face of the block, said blocks having bores and counterbores communicating with their said recesses and said flanges being adapted to enter the recesses extending beyond the faces of the blocks, conductor terminal members connected with their respective conductors and seated in the bores and counterbores and projecting into the recesses and concealed by the latter, and means for tightly drawing up the sleeves to form a water-tight and moisture-proof connection.

3. A detachable semi-permanent coupling for high voltage cables comprising a pair of multi-conductor cables, interconnectable metallic sleeves, one attached to each cable, an insulating block secured in the end of each of said sleeves opposite the end of the respective cable, said blocks having recesses, certain of the recesses extending below the outer surfaces of the blocks and the other recesses being each surrounded by an annular flange extending beyond the face of the respective block, said flanges being complementary to and interfitting the recesses located below the faces of said insulating blocks to increase the leakage path of the current, conductor terminal members connected with their respective conductors and secured through the insulating blocks to project into said recesses, and means for tightly drawing up the sleeves to form a water-tight and moisture-proof connection.

CLEMENT C. LEY.
ELMONT W. PORCH.